Figure 1:
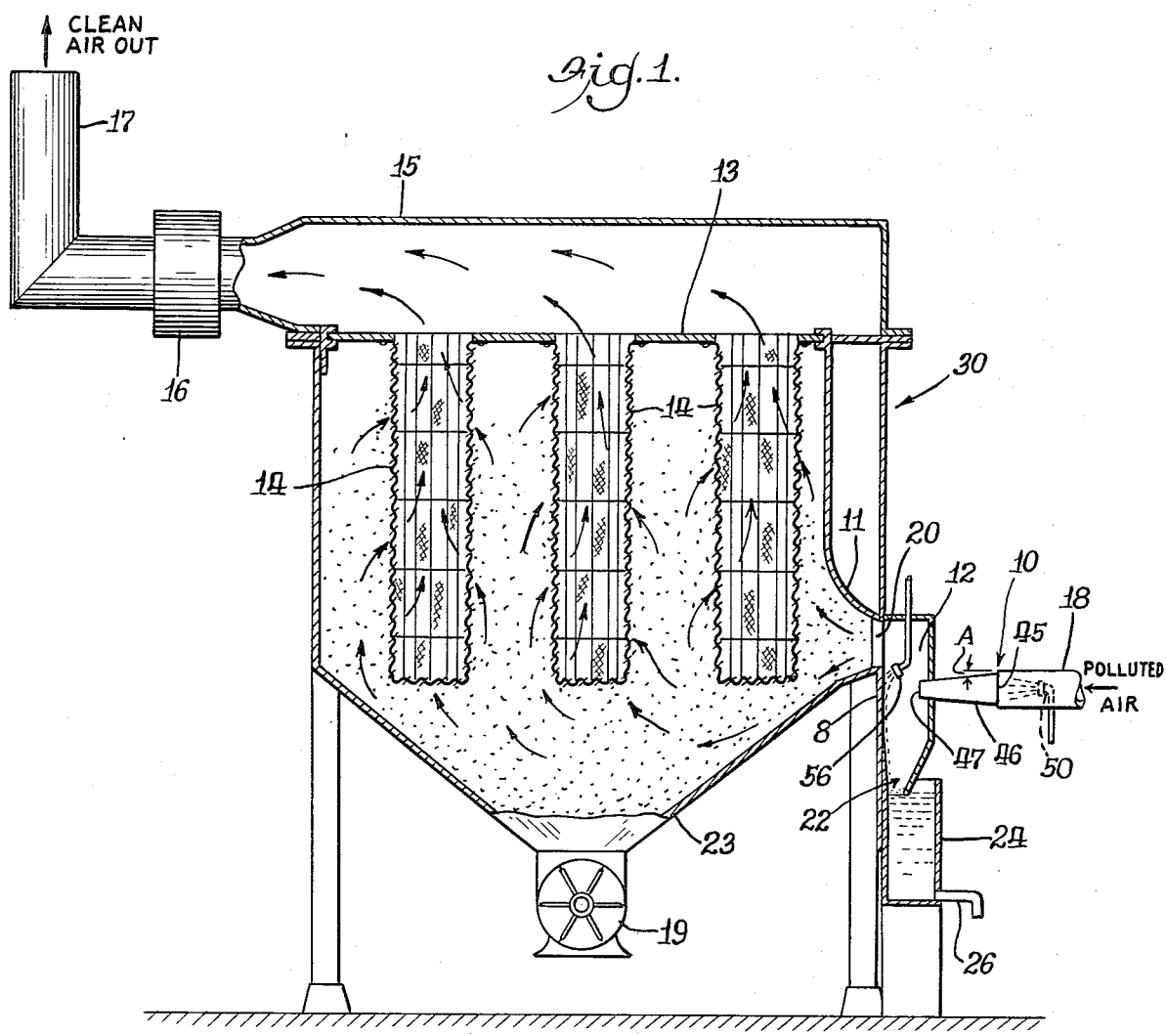

United States Patent [19]

Pircon

[11] 4,229,189
[45] * Oct. 21, 1980

[54] POLLUTION CONTROL APPARATUS AND METHOD

[76] Inventor: Ladislav J. Pircon, 305 Canterberry La., Oak Brook, Ill. 60521

[*] Notice: The portion of the term of this patent subsequent to Nov. 18, 1992, has been disclaimed.

[21] Appl. No.: 952,058

[22] Filed: Oct. 17, 1978

Related U.S. Application Data

[63] Continuation-in-part of Ser. No. 816,677, Jul. 18, 1977, Pat. No. 4,120,670, which is a continuation-in-part of Ser. No. 632,648, Nov. 17, 1975, Pat. No. 4,016,609, which is a continuation-in-part of Ser. No. 252,914, May 12, 1972, Pat. No. 3,920,422, which is a continuation-in-part of Ser. No. 190,248, Oct. 18, 1971, Pat. No. 3,853,506.

[51] Int. Cl.² .................................................. B01D 47/06
[52] U.S. Cl. .......................................... 55/90; 55/241; 55/324; 55/335; 55/465
[58] Field of Search ............... 55/90, 91, 240, 241, 55/242, 320, 324, 334, 335, 462, 465

[56] References Cited

U.S. PATENT DOCUMENTS

| 1,981,356 | 11/1934 | Hatch | 55/334 |
| 2,790,509 | 4/1957 | Share | 55/324 |
| 3,540,190 | 11/1970 | Brink, Jr. | 55/259 |
| 3,920,422 | 10/1975 | Pircon | 55/90 |
| 3,957,465 | 5/1976 | Pircon | 55/90 |
| 4,073,634 | 2/1978 | Pircon et al. | 55/73 |

Primary Examiner—Frank Sever
Attorney, Agent, or Firm—Thomas W. Speckman

[57] ABSTRACT

Apparatus and method operating at relatively low pressure drop and low initial velocity for removing pollutants down to sub-micron sizes from gas streams comprising a nozzle means accelerating the gas flow and impinging the pollutants upon a plate for removal of a major portion of pollutants and then passing the gas stream through fabric filters for removal of substantially all of the remaining particulate pollutants.

22 Claims, 2 Drawing Figures

POLLUTION CONTROL APPARATUS AND METHOD

CROSS REFERENCE TO RELATED APPLICATIONS

This application is a continuation-in-part of my copending application, Ser. No. 816,677, filed July 18, 1977, to issue as U.S. Pat. No. 4,120,670 Oct. 17, 1978, which application is a continuation-in-part of application Ser. No. 632,648, filed Nov. 17, 1975, now U.S. Pat. No. 4,016,609, issued July 19, 1977, which application is a continuation-in-part of application Ser. No. 252,914, filed May 12, 1972, now U.S. Pat. No. 3,920,422 issued Nov. 18, 1975, which application is a continuation-in-part of application Ser. No. 190,248, filed Oct. 18, 1971, now U.S. Pat. No. 3,853,506, issued Dec. 10, 1974.

The general concern of the public and industry alike for the quality of the environment, particularly as expressed in modern pollution control laws, has intensified the search for more efficient and more economical means for controlling industrial effluvia. Special attention has been directed to the control of the discharge of undesirable gaseous and particulate pollutants into the atmosphere.

In the past, cyclone separators and bag collectors have been commonly employed for industrial pollution control. However, conventional cyclone separators do not achieve more than a moderate degree of particulate removal and are not considered effective in controlling emissions of pulverulent particles. Bag filters are of greater efficiency, even of finely divided solids, but are encumbered with the considerable expense of bag maintenance. Bag filters also exhibit declining efficiency as the bags clog in use and are incapable of handling hygroscopic or tacky particulates.

Electrostatic precipitators have also been utilized but these present disadvantages of high power consumption, expensive maintenance, high voltage and explosion hazards, corrosion problems due to necessary materials of construction, and cannot be used with gases containing high amounts of moisture.

Venturi gas scrubbers have also been used in attempts to obtain satisfactory industrial pollution control. It is generally recognized in the use of Venturi gas scrubbers that high gas flow velocities are necessary to obtain most effective gas flow results. However, when the velocity through the Venturi reaches about 650 feet per second, the pressure drop through the Venturi becomes so substantial that an increase in velocity beyond that is impractical. Even at the conventional velocities used, the Venturi section introduces a large pressure drop, in the order of 15 to 30 inches of water, resulting in large power consumption to maintain flow through the cleaning apparatus. Further, as speed of flow through the Venturi apparatus is increased, the greater is the tendency for particles to disintegrate into smaller sizes, thereby increasing the small-sized particles passing out of the effluent stack.

Therefore, an object of the present invention is to provide an apparatus for removal of pollutants from a gas stream which is highly efficient and useful in a wide variety of applications.

A more general object of the invention is to provide an apparatus for removing pollutants from a gas stream which has a relatively low pressure drop across the apparatus.

Another object of the invention is to provide an apparatus which is continuous in its operation and has a low gas velocity while removing sub-micron particles from a gas stream with high efficiency.

Still another object of the invention is to provide an apparatus which is self-cleaning and non-clogging.

An object of this invention is to provide an apparatus and method for removing noxious odors and chemically reacting particles in polluted gas streams.

A further object of the invention is to provide an apparatus and method for agglomerating particles in gas streams which is efficient under dry operations.

Another object is to provide a combination apparatus and method whereby an impingement portion removes a major portion of particulates in the entering gas stream and a fabric filter portion removes substantially all of the remaining particulate pollutants down to sub-micron sizes from gas streams.

Figure 2:
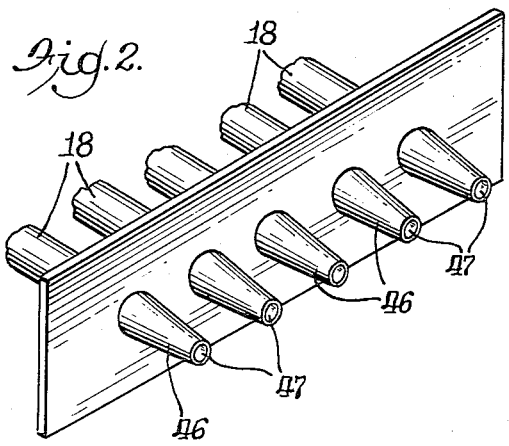

These and other objects and features of the invention will become more apparent from the following description and the figures showing preferred embodiments:

FIG. 1 shows a diagrammatic view of one embodiment of an apparatus of this invention; and FIG. 2 shows another embodiment of an apparatus of this invention using five nozzles.

Referring now to FIG. 1, the impingement portion of the apparatus of my invention for removing pollutants from stack effluvia is indicated generally by the reference numeral 10 and the fabric filter portion by reference numeral 30. Impingement apparatus 10 comprises a main work vessel or expansion chamber 12 and impingement surface formed by plate 8. Chamber 12 is provided with holding means for supporting nozzle 46 in a generally horizontal position with entry 45 in communication with polluted gas delivery conduit 18. Nozzle 46 has outlet 47 in communication with chamber 12. Chamber 12 also is arranged with gas stream outlet 20 which, in the illustrated embodiment, is located vertically above and generally horizontally opposite nozzle outlet 47. Chamber 12 has pollutant discharge opening 22 which is maintained in air-tight relationship with tank 24, for example, by being submerged beneath the liquid contained in holding tank 24. The liquid in tank 24 being commonly a dilute water solution of the pollutants being removed from the gas stream. Tank 24 is provided with suitable outlet means 26 for removal of pollutants. When the system is operated dry, the pollutants fall into tank 24 and means for their removal provided. A rotary valve, for example, may be provided at discharge opening 22 to maintain an air-tight relationship and completely dry operation of the impingement portion of the apparatus.

Conduit 18 is connected to the exhaust from a pollution source such as a furnace, grinding, crushing, or other size reduction equipment or the effluent of casting operations or the like. Input conduit 18 may be connected to any pollution-containing gas source. The polluted air and/or other gases are fed into conduit 18 under a certain velocity by means of a blower or other like device, not shown, or may be sucked through the apparatus by an exhaust blower in the exhaust stack of the apparatus, shown as 16. In order to accelerate the polluted gas stream toward the impingement plate 8, nozzle 46 is mounted in the gas stream inlet of chamber 12. Nozzle 46 will be more fully described below. It is sufficient here to say that nozzle 46 serves to agglomerate the pollutants of the gas stream.

Particulate agglomeration may, if compatible with operation of the fabric filter means, be further enhanced by spraying liquid into the gas stream in advance of nozzle 46 through spray 50 situated generally in the delivery conduit 18 as shown. Liquid is forced through the spray device 50 by means of a pump. Spray 56 may be located to direct a spray of suitable liquid over impingement surface 8 to clean the impingement surface. Spray 56 may be operated intermittently as required to clean the impingement surface. The liquid in tank 24 may also serve as the supply for liquid being delivered by the spray device 56. The necessary piping for such sprays is readily apparent.

For some applications for removing pollutants from effluent stacks, it may be desirable to use fresh water in spray 50. When the effluent gas contains undesirable chemical effluents, weak solutions of a chemical may be introduced through spray 50 which chemically reacts with the undesired chemicals. For example, noxious odors may be removed by introducing weak solutions of chemicals which oxidize the odor-causing chemicals in the effluent stream. Also, undesired sulphur or nitrogen-containing compounds may be oxidized by introduction of dilute oxidizing agents such as sodium chlorate or potassium chlorate.

However, when liquid is used in conjunction with nozzle 46 or in cleaning the impingement surface in this invention combining impingement with passage of the gas stream through fabric filters, the liquid must evaporate or be removed by a demister prior to the fabric filters. In the case of polluted streams from furnaces or hot chemical processes, the heat of the air stream may be sufficient to achieve such evaporation. This provides most efficient wet utilization of the impingement apparatus and dry utilization of the fabric filters. The evaporation may also be used for cooling the air stream prior to the fabric filters. In most applications according to this invention utilizing the impingement apparatus in combination with fabric filters, it is preferred to operate a dry system without any liquid. I have found that when operating the system dry the impingement portion removes a predominate portion of the particulates, generally over about 70 percent and frequently over about 90 to 95 percent. This greatly reduces the load placed upon the fabric filters and thereby reduces the required fabric filter surface area and reduces the fabric filter cleaning problems. The increased efficiency of the fabric filter using the combination of this invention provides removal of a substantial amount of the remaining particulates forming clarified gas having over about 90 to 95 and frequently up to 99+ weight percent of the original particulates removal.

Nozzle 46 is an important feature of my invention. I have found that using the apparatus of this invention very high efficiency rates in removal of a wide variety of particle sizes in gas streams can be obtained through use of nozzles shown in FIG. 1 as 46 having gas velocities at the entry of about 15 to 175 feet per second as compared with Venturi's having 333 to 666 feet per second. The Venturi by its nature and high velocity operation requires controlled expansion after the gas passes through the throat resulting in pressure drops of 18 to 40 inches of water at the above mentioned velocities.

The apparatus of my invention has an expansion volume into which the gas stream passes from the exit of the nozzle. The apparatus of my invention operates at about 0.4 to 8 inches of water pressure drop throughout the impingement portion and less pressure drop through the fabric filter portion than obtained with presently used fabric filter apparatuses. In the apparatus of my invention it is desired that the entry velocity of the gas be low. Usually the velocity of gases in efficient stacks is controlled by governmental codes in order to retain the particulate matter in suspension. Thus, as pointed out above, the entry velocities for gases in the apparatus of my invention may be at the low range of velocities generally permitted by governmental codes.

The gas containing particulates, according to my invention, is passed through a nozzle means such as 46 in FIG. 1 having an entry at one end portion (45) and an outlet at the other end portion (47) wherein the cross-sectional area of the entry to the nozzle is about 2 to 12 times the effective cross-sectional area of the outlet area of the nozzle. By effective cross-sectional area I mean the area at 90 degrees to the axis of gas flow. It is preferred that the entry to the nozzle have a cross-sectional area about 3 to 5 times the cross-sectional area of the outlet of the nozzle. The length of the converging portion of the nozzle is determined by the angle of convergence shown as A in FIG. 1. It is preferred that the mean angle of convergence be about 4 to 8 degrees, about 5.5 to 6.5 degrees being preferred. About 6 degrees is especially preferred. By mean angle of convergence, I mean as measured on the line drawn from the entry to the outlet. It is preferred that the entry be round and the nozzle conical, but other symmetrical geometrical shapes are satisfactory. I have found it suitable for the diameter of the nozzle outlet to be about 0.5 to 0.7 times the distance from the outlet to the impingement means, about 0.6 times being preferred.

The particulate-containing gas is accelerated in nozzle 46 due to outlet 47 being of smaller cross-sectional area than entry 45. As pointed out above, the gas is accelerated to a velocity at out 47 of about 2 to 12 times its velocity at entry 45. Upon passing from outlet 47 to expansion chamber 12, the gas expands rapidly, thereby quickly reducing its velocity. The distance from outlet 47 to impingement surface 8 must be such that a large portion of the particulate matter in the gas reaches impingement surface 8 at the much reduced gas velocity.

It is believed the high efficiency of the impingement portion of the apparatus and process of my invention is due to the differential velocity, differential acceleration and differential deceleration of different-sized particles in the gas stream. The interplay of differing forces and different-sized particles caused by the geometry of the gas acceleration in the nozzle and deceleration in the large expansion volume causes extremely high particle collision resulting in very high agglomeration. It appears that smaller sub-micron particles are more efficiently agglomerated by the impingement portion of the apparatus of my invention than larger-sized particles.

Due to the extremely high efficiency of agglomeration as pointed out above, the impingement portion of the apparatus of my invention may be operated without water sprays. When the apparatus of my invention is operated with water spray 50, the introduced gas should be below the temperature at which the droplets will flash to steam, that is, about 212 degrees F., unless the size of the droplet or water temperature is used to compensate for the effect of vaporization or if vaporization is desired.

Multiple nozzles may be connected to a gas stream as shown diagrammatically in FIG. 2 so long as the gases from the outlets of the nozzles impinge upon a suitable impingement surface or surfaces. Thus, the nozzle means shown in FIG. 2 made up of multiple nozzles as defined above may be substituted for the single nozzle shown in FIG. 1.

The desirable factors for the impingement surface is that of sufficient size and distance from nozzle outlet 47 to permit substantially all of the particulate matter in the gas stream passing through the expansion zone from outlet 47 to reach its surface. Distances I have found to be satisfactory have been set forth above. It is also desired, but not necessary, that the surface of the impingement means be provided with means for substantially continuously removing particulate matter from that surface. It is preferred that the impingement means have an imperforate surface upon which impingement takes place.

The fabric filter portion of the apparatus and method of my invention may be any of the fabric filters known to or developed by the art. The present invention combines a defined impingement apparatus which removes a major portion of pollutants from a polluted gas stream with a fabric filter particulate removal apparatus. This combination provides a smaller, highly efficient unit predominately for dry particulate removal. The highly efficient dry operating impingement portion of the combination reduces both the required fabric surface area and the fabric cleaning, both previously severe disadvantages of removing pollutants by fabric filtration.

Several types of fabric filters are presently known to the art including conventional bag filters, reverse flow bag filters, envelope filters and the like. Suitable fabric filters are more completely described in: Air Pollution, Second Edition, Volume III, Sources of Air Pollution and Their Control, pages 410–413, Edited by Arthur C. Stern, Academic Press, 1968, and Air Pollution, Third Edition, Volume IV, Engineering Control of Air Pollution, pages 159–163, Edited by Arthur C. Stern, Academic Press.

FIG. 1 shows, exemplary of fabric filters, a bag filter employing reverse flow and mechanical shaking for cleaning indicated generally as 30 in combination with impingement apparatus 10. As shown in FIG. 1, the side wall of the bag filter housing serves as flat impingement surface 8 to conserve space. The gas stream, already ridded of a major portion of its pollutants, at least in excess of about 70 weight percent and frequently in excess of about 90 weight percent, passes from impingement apparatus 10 into fabric filter 30 through inlet 12. If impingement apparatus 10 is operated wet or if the polluted gas stream contains liquid not entirely removed by impingement apparatus 10, a demister or other suitable moisture removing device may be located in inlet 12. The gas stream, containing a minor amount of pollutants, less than about 30 weight percent, as compared with its original amount, passes through fabric bags 14 and manifold 15, drawn by blower 16 and passing out effluent stack 17 as clean air. Fabric bags 14 collect the pollutants as the gas stream passes through the fabric, thus collecting the pollutants on the outside of bags 14 as shown in FIG. 1. To minimize pressure drop across the fabric filters and increase their collection efficiency, fabric bags 14 may be suspended from shaker plate 13 to provide frequent shaking of fabric bags 14 dislodging the pollutants from the fabric and dropping them into hopper 23. Pollutants may be removed from hopper 23 through rotary valve 19 to prevent alteration of pressure within the system. It is readily apparent that any fabric filter means may be used in the combination of this invention and the specific physical arrangement would be clear to one skilled in the art after reading this description.

Much of the specific description of my invention has referred to removal of pollutants from gas streams. It is readily recognized that my apparatus and process is suitable for removal of any particulate matter from any gas stream under operating conditions described. While the description of my invention has referred to the particulate-containing gas stream as emanating from specific polluting apparatus, it is clear that the apparatus and process of my invention are also applicable to purifying recirculating air. In this manner pollutant-containing atmospheres may be cleaned by the apparatus and process of my invention.

This invention provides a process for removing particulate matter from gas streams by combination of impingement and filtration comprising: passing said gas stream having particulate matter therein through the entry of a nozzle; accelerating the gas stream through a converging portion of said nozzle having a mean angle of convergence of about 4 to 8 degrees providing outlet velocities of about 2 to 12 times the entrance velocity; passing said particulate-containing gas stream from the nozzle outlet through an expansion zone decelerating the gas, said acceleration and deceleration of the gas stream causing particulates to agglomerate; impinging said agglomerates and particulates upon a fixed impingement surface of substantially imperforate material thereby separating said particulates and agglomerates from said gas stream; removing said particulates and agglomerates from the expansion zone; separately removing gas having a major portion of original particulate matter removed therefrom from the expansion zone and passing it through fabric filter means removing a substantial amount of the remaining particulates forming clarified gas; and removing the clarified gas from said fabric filter means. The combination process of this invention provides a highly efficient process for particulate removal from polluted gas streams by more effective use of fabric filters than previously possible. The combination process of this invention also provides a highly efficient process for particulate removal using less energy than previously used fabric filter systems.

The following examples are intended as illustrations of various embodiments of my invention which should not be limited thereby.

EXAMPLE I

The impingement portion of the apparatus, as shown in FIG. 1, was used to remove quarry dust from a gas stream. The apparatus used a nozzle 12 inches diameter at the input and 6 inches diameter at the exit with the angle of convergence of approximately 6 degrees as shown in the apparatus illustrated in FIG. 1. The exit of the nozzle was 10 inches from the impingement plate. The dust was fed into the system, at a constant rate, by means of a screw feeder which conveyed dust from a storage hopper to a tube which discharged in the stack leading to the nozzle input. The gas containing dust was passed through the nozzle under conditions shown in Table I using the dust loading indicated. The velocity was determined by using a Dwyer Air Velocity Meter No. 400. For determination of the dust content and particle size distribution in the gas a Monsant Enviro-Chem's Brink BMS-11 Sampling Kit was used with a Model B Cascade Impactor having five in-line stages, each of which contained a jet that utilizes a collection cup as an impaction plate. These five cups collect particles ranging in size from 3 microns to 0.33 microns. Columnar gas separation techniques were used for ascertaining size measurement of dust feed stock replicates. The exhaust gas from the impingement portion of the apparatus was analyzed by using the Model B Cascade Impactor in the exhaust stack. The gas entering the sampling tube was drawn through the tube at the same velocity as the gas passing the tube inlet in order to establish isokinetic conditions. After each test run, the collection cups were removed and weighed on an analytical balance to the nearest tenth of a milligram. From such measurements the weight percent of feed solids removed was determined.

The apparatus was operated both with and without water sprays as indicated in Table I. The pressure drop across the entire apparatus was ascertained by connecting one side of a water manometer to the stack leading to the nozzle and the other side to the effluent stack from the apparatus.

Results using quarry dust are shown in Table I:

TABLE I

|  | Test Groups | |
|---|---|---|
|  | I | II |
| Water Rate - |  |  |
| Gallons per Hour - Total | 3.0 | 0 |
| Gallons per Hour - |  |  |
| Spray in Nozzle Input | 3.0 | 0 |
| Pressure Drop - |  |  |
| Inches of Water | 0.75 | 0.75 |
| Percentage Removal - |  |  |
| Arithmetic Mean | 98.8 | 97.3 |
| Removal - |  |  |
| Standard Deviation | 0.078 | 0.91 |
| Removal - | 98.8– | 95.7– |
| Range Percentage | 99.0 | 98.4 |
| Average Dust Loading - |  |  |
| Grains per Cubic Foot | 2.99 | 3.29 |
| Entry Volume in Cubic |  |  |
| Feet per Minute | 785 | 785 |

TABLE II

SIZE DISTRIBUTION OF QUARRY DUST ADDED IN RUNS SHOWN IN TABLE I

| U.S. Standard | Percentage Retained on Screen Test Groups | |
|---|---|---|
| Mesh Sieves | I | II |
| +100 | 68.5 | 38.4 |
| +200 | 83.7 | 66.2 |
| +325 | 93.2 | 93.3 |
| −325 | 6.8 | 6.7 |

It is seen that operating the impingement portion of the apparatus of this invention dry, over about 95 weight percent of the particulates are removed leaving only about 5 weight percent for the fabric filter portion to remove. Thus the fabric filter operates at high efficiency and lower pressure drop than if it were presented all of the particulate removal of the original polluted gas stream.

EXAMPLE II

The same impingement portion of the apparatus as described in Example I was used for removal of fertilizer dust from air streams. The apparatus was operated under conditions set forth in Table III using fertilizer dust added as shown in Table IV, resulting in the removal shown in Table III. The water rate through the spray in the nozzle input was 0.0416 gallons per minute. Sampling trains as prescribed by the U.S. Environmental Protection Agency Method 5 were used in conjunction with an apparatus having a fixed flat plate impingement surface for treatment of exhaust from a fertilizer granulation plant including dust from the dryer and resulted in meeting emission regulations allowing issuance of a permit in the State of Georgia.

TABLE III

|  | Test Groups | | |
|---|---|---|---|
|  | I | II | III |
| Pressure Drop - |  |  |  |
| Inches of Water | 0.75 | 1.9 | 1.9 |
| Average Dust Loading - |  |  |  |
| Grains per Cubic Foot | 2.30 | 2.54 | 22.0 |
| Entry Volume in Cubic |  |  |  |
| Feet per Minute | 785 | 1200 | 945 |
| Percentage Removal | 95+ | 95+ | 95+ |

TABLE IV

SIZE DISTRIBUTION OF FERTILIZER DUST ADDED In RUNS IN TABLE III

| U.S. Standard | Percentage Retained on Screen Test Groups | | |
|---|---|---|---|
| Mesh Sieves | I | II | III |
| +200 | 96.0 | 21.3 | 79.5 |
| −200 | — | — | — |
| +100 | 24.7 | 3.8 | 63.6 |
| +325 | — | 49.4 | 85.1 |
| −325 | — | 50.6 | 14.9 |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process for removing particulate matter from gas streams by combination of impingement and filtration comprising: passing said gas stream having particulate matter therein through the entry of a nozzle; accelerating the gas stream through a converging portion of said nozzle having a mean angle of convergence of about 4 to 8 degrees providing outlet velocities of about 2 to 12 times the entrance velocity; passing said particulate-containing gas stream from the nozzle outlet through an expansion zone decelerating the gas, said acceleration and deceleration of the gas stream causing particulates to agglomerate; impinging said agglomerates and particulates upon a fixed impingement surface of substantially imperforate material thereby separating said particulates and agglomerates from said gas stream; removing said particulates and agglomerates from the expansion zone; separately removing gas having a major portion of original particulate matter removed therefrom from the expansion zone and passing it through fabrice filter means removing a substantial amount of the remaining particulates forming clarified gas; and removing the clarified gas from said fabric filter means; said acceleration, deceleration and impinging removing in excess of about 70 weight percent of said particulate matter in said gas stream.

2. The process of claim 1 wherein said impingement surface is a flat surface.

3. The process of claim 2 wherein said gas stream is at a velocity of about 15 to 175 feet per second upon entry to said nozzle.

4. The process of claim 2 wherein said outlet velocity is about 3 to 5 times the entrance velocity.

5. The process of claim 2 wherein liquid spray is introduced to said gas stream having particulate matter therein, prior to entry of a nozzle.

6. The process of claim 2 wherein said gas upon removal from said expansion zone passes through a de-misting means.

7. The process of claim 2 wherein said gas stream is passed through multiple nozzles.

8. The process of claim 2 wherein said particulates are different sized particles and the acceleration and deceleration of said gas stream induces differential accelerations and differential decelerations to the different sized particles thereby inducing differential velocities of the particles causing high agglomeration of said particles.

9. The process of claim 2 wherein said nozzle outlet has a diameter about 0.5 to 0.7 times the distance from the nozzle outlet to the impingement means.

10. The process of claim 2 wherein over about 70 weight percent of the original particulates are removed from the gas stream by impingement prior to filtration.

11. The process of claim 10 wherein after filtration over about 95 weight percent of the original particulates have been removed from the gas stream.

12. The process of claim 2 wherein said mean angle of convergence is about 5.5 to 6.5 degrees.

13. The process of claim 1 wherein said nozzle is conical.

14. An apparatus for removing particulate matter from gas streams by combination of impingement and filtration comprising:

a chamber defining a gas expansion zone;

nozzle means having an entry at one end and an outlet at the other end, said entry being in communication with a gas stream having undesired particulate matter entrained therein and said outlet being in communication with said gas expansion zone, said entry having an effective cross-sectional area of about 2 to 12 times the effective cross-sectional area of said outlet and the mean angle of convergence of said nozzle being in the range of about 4 to 8 degrees;

impingement means comprising a fixed impingement imperforate surface in said expansion zone opposite said nozzle outlet at a distance from said outlet to insure impingement thereon of substantially all particulate matter entrained in the gas stream passing from said nozzle outlet after expansion of the gas stream in said chamber reducing the gas velocity;

means for removing particulate matter from the expansion zone;

means for passing the gas having a major portion of original particulate matter removed therefrom from the upper portion of the expansion zone to a fabric filter means;

means for passing said gas having a major portion of original particulate matter removed therefrom through said fabric filter means removing a substantial amount of the remaining particulates;

means for removing particulates from said fabric filter means; and means for separately removing the clarified gas from said fabric filter means.

15. The apparatus of claim 14 wherein said impingement surface is a flat surface.

16. The apparatus of claim 15 wherein said entry has an effective cross-sectional area of about 3 to 5 times the effective cross-sectional area of said outlet.

17. The apparatus of claim 15 wherein said mean angle of convergence is about 5.5 to 6.5 degrees.

18. The apparatus of claim 15 having a liquid spray means in said gas stream ahead of said nozzle entry and directed toward said nozzle entry.

19. The apparatus of claim 15 wherein said means for removing the clarified gas stream from the expansion zone comprises a de-misting means.

20. The apparatus of claim 15 wherein said nozzle outlet has a diameter about 0.5 to 0.7 times the distance from the nozzle outlet to the impingement means.

21. The apparatus of claim 15 wherein said nozzle means comprises multiple nozzles.

22. The apparatus of claim 14 wherein said nozzle is conical.

* * * * *